US008729006B2

(12) United States Patent
Miralles et al.

(10) Patent No.: US 8,729,006 B2
(45) Date of Patent: May 20, 2014

(54) METHODS AND COMPOSITIONS USING SODIUM CARBOXYMETHYL CELLULOSE AS SCALE CONTROL AGENT

(75) Inventors: Altony Miralles, Woodbury, MN (US); Xin Sun, Eagan, MN (US); Michelle Fung, Eden Prairie, MN (US); John Krueger, Rosemont, MN (US)

(73) Assignee: Ecolab USA Inc., Saint Paul, MN (US)

( * ) Notice: Subject to any disclaimer, the term of this patent is extended or adjusted under 35 U.S.C. 154(b) by 90 days.

(21) Appl. No.: 13/170,384

(22) Filed: Jun. 28, 2011

(65) Prior Publication Data

US 2013/0005639 A1 Jan. 3, 2013

(51) Int. Cl.
  *C11D 7/10* (2006.01)
  *C11D 7/26* (2006.01)
  *C11D 7/36* (2006.01)

(52) U.S. Cl.
  USPC .......... 510/245; 510/247; 510/253; 510/254; 510/470; 510/476; 510/477; 510/488; 510/467

(58) Field of Classification Search
  USPC ......... 510/245, 247, 253, 254, 470, 476, 477, 510/488, 467
  See application file for complete search history.

(56) References Cited

U.S. PATENT DOCUMENTS

| | | | |
|---|---|---|---|
| 3,699,048 A | 10/1972 | Kruger et al. | |
| 4,379,061 A * | 4/1983 | Rabitsch et al. | 510/361 |
| 4,561,982 A | 12/1985 | Kuriyama et al. | |
| 4,609,483 A | 9/1986 | Cuisia et al. | |
| 4,680,125 A | 7/1987 | Cuisia et al. | |
| 4,713,195 A | 12/1987 | Schneider | |
| 5,021,096 A | 6/1991 | Abadi | |
| 5,389,284 A * | 2/1995 | van der Hoeven et al. | 510/413 |
| 5,985,152 A | 11/1999 | Otaka et al. | |
| 6,111,097 A | 8/2000 | Nagashima et al. | |
| 6,130,328 A | 10/2000 | Shimpo et al. | |
| 6,222,031 B1 | 4/2001 | Wakabayashi et al. | |
| 6,440,327 B1 | 8/2002 | Shevchenko et al. | |
| 6,740,630 B2 * | 5/2004 | Aouad et al. | 510/404 |
| 7,727,945 B2 | 6/2010 | Rodrigues et al. | |
| 8,227,381 B2 * | 7/2012 | Rodrigues et al. | 507/90 |
| 2002/0137649 A1 * | 9/2002 | Carnali et al. | 510/220 |
| 2003/0050213 A1 * | 3/2003 | Aouad et al. | 510/404 |
| 2004/0244969 A1 | 12/2004 | Kotlar et al. | |
| 2007/0105744 A1 * | 5/2007 | Amiconi | 510/515 |
| 2007/0179076 A1 * | 8/2007 | Gibson et al. | 510/392 |
| 2007/0281866 A1 | 12/2007 | Viloria et al. | |
| 2008/0277620 A1 | 11/2008 | Kesavan et al. | |
| 2009/0023613 A1 | 1/2009 | Li et al. | |
| 2009/0176687 A1 * | 7/2009 | Tjelta et al. | 510/445 |
| 2010/0154831 A1 | 6/2010 | Neplenbroek et al. | |
| 2010/0300493 A1 * | 12/2010 | Snodgrass et al. | 134/26 |

FOREIGN PATENT DOCUMENTS

| | | |
|---|---|---|
| EP | 1 405 671 B1 | 12/2005 |
| EP | 2 014 757 A1 | 1/2009 |
| GB | 1 322 536 | 7/1973 |
| JP | 62260081 A | 11/1987 |
| JP | 62260082 A | 11/1987 |
| JP | 62260083 A | 11/1987 |
| JP | 10298203 A | 11/1998 |
| JP | 11029601 A | 2/1999 |
| JP | 2001089502 A | 4/2001 |
| WO | WO 88/06143 A1 | 8/1988 |
| WO | WO 01/21854 A2 | 3/2001 |
| WO | WO 01/21854 A3 | 3/2001 |
| WO | WO 2008/147940 A2 | 12/2008 |
| WO | WO 2008/147940 A3 | 12/2008 |
| WO | WO 2009/006603 A1 | 1/2009 |
| WO | WO 2010/016434 A1 | 2/2010 |
| WO | WO 2010/065482 A1 | 6/2010 |

OTHER PUBLICATIONS

Lanxess, "Bayhibit(R)", http://lanxess.in/en/industries-products-india/industries-india/water-treatment-india/bayhibit . . . [retrieved from Internet on Jan. 31, 2011], 3 pages.
JP 62260081 A—Abstract—Mitsubishi Heavy Ind Ltd., 1 page, Oct. 2011.
JP 62260082 A—Abstract—Mitsubishi Heavy Ind Ltd., 1 page, Oct. 2011.
JP 10298203 A—Abstract—Mitsubishi Gas Chemical Co., 1 page, Oct. 2011.
JP 11029601 A—Abstract—Mitsubishi Gas Chemical Co., 1 page, Oct. 2011.
JP 62260083 A—Abstract—Mitsubishi Heavy Ind Ltd., 1 page, Oct. 2011.
JP 2001089502 A—Abstract, 1 page, Oct. 2011.

* cited by examiner

*Primary Examiner* — Gregory R DelCotto
(74) *Attorney, Agent, or Firm* — McKee, Voorhees & Sease, P.L.C.

(57) ABSTRACT

The present invention includes methods and compositions that employ sodium carboxymethyl cellulose as a scale inhibitor. According to the invention, scale inhibiting compositions are disclosed which include, sodium carboxymethyl cellulose and a polymer such as polymaleic acid, polyacrylic acid or mixtures, copolymers or terpolymers of the same and optionally may also include a phosphonate. The scale control composition may be incorporated into a detergent/cleaning composition.

20 Claims, No Drawings

METHODS AND COMPOSITIONS USING SODIUM CARBOXYMETHYL CELLULOSE AS SCALE CONTROL AGENT

FIELD OF THE INVENTION

The present invention is related to methods of preventing hard water scale formation and deposition, using sodium carboxymethyl cellulose as a scale inhibitor.

BACKGROUND OF THE INVENTION

The level of hardness in water can have a deleterious effect in many systems. For example, when hard water alone, or in conjunction with cleaning compositions, contacts a surface, it can cause precipitation of hard water scale on the contacted surface. Scaling is the precipitation of a salt from a solution that is supersaturated with respect to the salt. In general, hard water refers to water having a total level of calcium and magnesium ions in excess of about 100 ppm expressed in units of ppm calcium carbonate. Often, the molar ratio of calcium to magnesium in hard water is about 2:1 or about 3:1. Although most locations have hard water, water hardness tends to vary from one location to another.

Hard water is also known to reduce the efficacy of conventional alkaline detergents used in the vehicle care, warewashing and laundry industries. One method for counteracting this includes adding chelating agents or sequestrants into detersive compositions that are intended to be mixed with hard water in an amount sufficient to handle the hardness. However, in many instances the water hardness exceeds the chelating capacity of the composition. As a' result, free calcium ions may be available to cause precipitation, or to attack active components of the composition causing other deleterious effects, such as poor cleaning effectiveness or lime scale build up.

Alkaline detergents, particularly those intended for institutional and commercial use, generally contain phosphates, nitrilotriacetic acid (NTA) or ethylenediaminetetraacetic acid (EDTA) as a sequestering agent to sequester metal ions associated with hard water such as calcium, magnesium and iron and also to remove soils.

In particular, NTA, EDTA or polyphosphates such as sodium tripolyphosphate and their salts are used in detergents because of their ability to solubilize preexisting inorganic salts and/or soils. When calcium, magnesium salts precipitate, the crystals may attach to the surface being cleaned and cause undesirable effects. For example, calcium carbonate precipitation on the surface of ware can negatively impact the aesthetic appearance of the ware, giving an unclean look. The ability of NTA, EDTA and polyphosphates to remove metal ions facilitates the detergency of the solution by preventing hardness precipitation, assisting in soil removal and/or preventing soil redeposition during the wash process.

While effective, phosphates and NTA are subject to government regulations due to environmental and health concerns. Although EDTA is not currently regulated, it is believed that government regulations may be implemented due to environmental persistence. There is therefore a need in the art for an alternative, and preferably environment friendly, cleaning composition that can reduce the content of phosphorous-containing compounds such as phosphates, phosphonates, phosphites, and acrylic phosphinate polymers, as well as persistent aminocarboxylates such as NTA and EDTA.

Accordingly it is an object herein to provide an improved process for the prevention of scale in alkaline cleaning such as that used in ware washing, hard surface or CIP cleaning, car washing, instrument cleaning, boiler or cooling tower cleaning, laundry cleaning and the like.

It is another object to provide scale control compositions that may be used in conjunction with a cleaning composition for prevention of scale deposits not only on surfaces to be cleaned, but also on the cleaning machine components themselves.

Other objects, aspects and advantages of this invention will be apparent to one skilled in the art in view of the following disclosure, the drawings, and the appended claims.

SUMMARY OF THE INVENTION

The present invention describes methods and compositions using sodium carboxymethyl cellulose as a scale control agent. The invention includes the use of sodium carboxymethyl cellulose (CMC) under alkaline conditions in combination with a carboxylic acid polymer, such as polymaleic acid and/or polyacrylic acid and the like. The invention also in some embodiments includes additional components such as phosphonates and chelants.

The present invention relates to scale control methods which exhibit soil suspension and anti-redeposition properties as well. The methods can be applied in any alkaline environment where it is desirable to prevent scaling. For example, the methods can be used in vehicle care applications, warewashing applications, laundering applications and food and beverage applications. Such applications include, but are not limited to: machine and manual warewashing, presoaks, laundry and textile cleaning and destaining, carpet cleaning and destaining, vehicle cleaning and care applications, surface cleaning and destaining, kitchen and bath cleaning and destaining, floor cleaning and destaining, cleaning in place operations, general purpose cleaning and destaining, and industrial or household cleaners In a warewashing embodiment, the invention includes the steps of applying an alkaline cleaning composition onto the dishes, which contains the scale inhibiting composition and then rinsing with water. The method and cleaning composition reduce scaling not just on the surfaces to be cleaned, but also the ware wash machines themselves.

DETAILED DESCRIPTION

The term "surfactant" or "surface active agent" refers to an organic chemical that when added to a liquid changes the properties of that liquid at a surface.

"Cleaning" means to perform or aid in soil removal, bleaching, microbial population reduction, rinsing, or combination thereof.

As used herein, the term "substantially free" refers to compositions completely lacking the component or having such a small amount of the component that the component does not affect the effectiveness of the composition. The component may be present as an impurity or as a contaminant and shall be less than 0.5 wt. %. In another embodiment, the amount of the component is less than 0.1 wt.-% and in yet another embodiment, the amount of component is less than 0.01 wt. %.

As used herein, the term "ware" includes items such as eating and cooking utensils.

As used herein, the term "warewashing" refers to washing, cleaning, or rinsing ware.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

The term "actives" or "percent actives" or "percent by weight actives" or "actives concentration" are used interchangeably herein and refers to the concentration of those ingredients involved in cleaning expressed as a percentage minus inert ingredients such as water or salts.

So that the invention maybe more readily understood, certain terms are first defined and certain test methods are described.

As used herein, "weight percent," "wt. %," "percent by weight," "% by weight," and variations thereof refer to the concentration of a substance as the weight of that substance divided by the total weight of the composition and multiplied by 100. It is understood that, as used here, "percent," "%," and the like are intended to be synonymous with "weight percent," "wt. %," etc.

The term "about," as used herein, modifying the quantity of an ingredient in the compositions of the invention or employed in the methods of the invention refers to variation in the numerical quantity that can occur, for example, through typical measuring and liquid handling procedures used for making concentrates or use solutions; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about," the claims include equivalents to the quantities. All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers subsumed within that range (e.g. 1 to 5 includes 1, 1.5, 2, 2.75, 3, 3.80, 4, and 5).

Methods and Compositions of the Invention

The present invention includes methods that use sodium carboxymethyl cellulose as a scale inhibitor and scale inhibiting compositions including sodium carboxymethyl cellulose in combination with polymers such as polymaleic and polyacrylic acid, phosphonates and the like. The scale inhibiting compositions include a scale inhibiting amount of sodium carboxymethyl cellulose and a polycarboxylic acid polymer such as polymaleic acid or polyacrylic acid or mixtures thereof. The composition is employed under alkaline conditions, typically at a pH of between about 9 and about 12. The compositions may be incorporated into cleaning compositions such as detergents as a scale control component In one embodiment, the scale inhibiting compositions include sodium carboxymethyl cellulose and polymaleic acid, polyacrylic acid, or combinations thereof wherein the components are present in a ratio of about 1 to about 5, preferably about 1 to about 3, or about 1 to about 2 percent weight ratio of CMC to polymer, although the ranges are not necessarily critical. The composition may also optionally include a phosphonate component and/or an optional weak chelant as well.

In a typical embodiment the scale inhibiting composition can comprise from about 0.1 wt. % to about 30 wt. % of CMC, about 0 wt. % to about 30 wt. % polymer, about 0 wt. % to about 30 wt. % of phosphonate and from about 0 wt. % to about 50 wt. % chelant. Any remainder can be a source of alkalinity or water. In another embodiment the scale inhibiting composition can comprise from about 0.1 wt. % to about 25 wt. % of CMC, about 0 wt. % to about 25 wt. % polymer, about 0 wt. % to about 20 wt. % of phosphonate and from about 0 wt. % to about 30 wt. % chelant. In yet another embodiment the composition can comprise from about 0.1 wt. % to about 20 wt. % of CMC, about 0 wt. % to about 20 wt. % polymer, about 0 wt. % to about 10 wt. % of phosphonate and from about 0 wt. % to about 10 wt. % chelant.

In another embodiment, the scale inhibiting composition may be incorporated within a detergent composition which would include the scale inhibiting component described above. Such detergent compositions would typically include a source of alkalinity and additional components such as de-foaming agents, bleaching agents and as will be discussed hereinafter.

Scale Inhibiting Component

The scale inhibiting composition comprises a scale inhibiting component of sodium carboxymethyl cellulose (CMC) and a polymer. Carboxymethyl cellulose (CMC) is a carboxymethyl derivative of cellulose formed by the reaction of cellulose with alkali and chloroacetic acid. As a result of the reaction, carboxymethyl groups are bound to some of the hydroxyl groups of the glucopyranose units that make up the backbone of cellulose. The degree of substitution of carboxymethyl varies from about 0.6 to 0.95 per glucopyranose unit. CMC is used in aqueous solutions usually as the sodium salt to increase viscosity.

Carboxymethyl cellulose is available in various molecular weights. Low molecular weight carboxymethyl cellulose has a Mw of about 90,000 and a 2% solution thereof will have a viscosity of about 1.1 cP at 25° C. Medium weight carboxymethyl cellulose has a Mw of about 250,000. High molecular weight carboxymethyl cellulose has a Mw of about 700,000 and a 2% solution will have a viscosity of about 12 cP at 25° C.

For the purpose of the present invention, any molecular weight CMC may be used, even mixtures of different weights. For example, from 25/75 to 75/25 carboxymethyl cellulose, preferably from 30/70 to 70/30 and most preferably about 35/65 medium/high molecular weight sodium carboxymethyl cellulose. Also any degree of substitution may be used as both high and medium substitution levels were tested and found to work.

Sodium-CMC is a generally-recognized-as-safe substance and previously has been used in food science as a viscosity modifier or thickener, and to stabilize emulsions in various products including ice cream. It is also a constituent of many non-food products, such as K-Y Jelly, toothpaste, laxatives, diet pills, water-based paints, detergents, textile sizing and various paper products. It is used primarily because it has high viscosity, is non-toxic, and is non-allergenic. The scale inhibiting compositions of the invention all employ CMC and can include CMC in a ratio of 1:5 wt. % of CMC to polymer, in another embodiment the ratio can be 1:1 wt. % and in yet another embodiment the ratio can be 5:1.

Polymer Component

The polymer component is a polycarboxylic acid, preferable polymaleic acid, polyacrylic acid, maleic/acrylic copolymers, maleic terpolymers or a mixture thereof.

Polymaleic acid $(C_4H_2O_3)x$ or hydrolyzed polymaleic anhydride or cis-2-butenedioic acid homopolymer, has the structural formula:

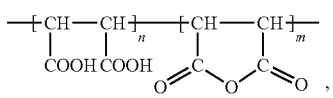

where n and m are any integer.

Examples of polymaleic acid homopolymers (and salts thereof) which may be used for the invention are particularly preferred are those with a molecular weight of about 200-2000. Commercially available polymaleic acids include the Belclene 200 series of maleic acid homopolymers from BWA™ Water Additives, 979 Lakeside Parkway, Suite 925 Tucker, Ga. 30084, USA. Particularly preferred is Belclene 200 or Aquatreat AR-801 available from AkzoNobel.

Polyacrylic acids, $(C_3H_4O_2)_n$ or 2-Propenoic acid homopolymer; Acrylic acid polymer; Poly(acrylic acid); Propenoic acid polymer; PAA have the following structural formula:

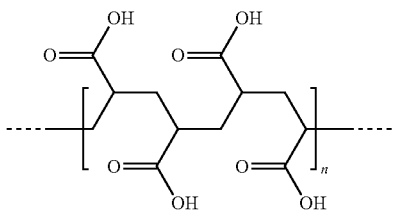

where n is any integer.

Examples of polyacrylic acid homopolymers (or salts thereof) acids which may be used for the invention are those with a molecular weight of at least about 4500. One source of commercially available polyacrylic acid homopolymers useful for the invention includes the Acusol 445 series from The Dow Chemical Company, Wilmington Del., USA. Other polyacrylic acid homopolymers (and salts thereof) commercially available are Acusol 929 (10,000 MW) and Acumer 1510 (60,000 MW) both also available from Dow Chemical. Yet another commercially available polyacrylic acid is AQUATREAT AR-6 (100,000 MW) from AkzoNobel Strawinskylaan 2555 1077 ZZ Amsterdam Postbus 75730 1070 AS Amsterdam. Examples of acrylic/maleic copolymer: acusol 448

Example of maleic terpolymer: Belclene 283

The scale control composition can be provided in a concentrate in an amount sufficient to provide a desired level of scale control when used in the use solution. There should be sufficient amount of scale control composition to provide the desired scale control inhibiting affect. It is expected that the upper limit on the scale control component will be determined by solubility. The scale control component can be provided in an inhibitor concentrate in an amount of at least about 0.005 wt. %. The scale control component can be provided in the scale control concentrate in an amount of between about 0.005 wt. % and about 41.5 wt. %, and more preferably between about 0.02 wt. % and about 27 wt. % and most preferably between 0.5% and 15% active.

Phosphonates

The composition may, in some embodiments, include a phosphonate. The phosphonate is preferably selected from the group containing 1-hydroxyethane(1,1-diylbiphosphonic acid) (HEDP), nitrilotris(methylenephosphonic acid) (NTMP), 2-phosphonobutane 1,2,4 tricarboxylic acid, diethylenetriaminepentakis(methylenephosphonic acid) (DTPMP), 1,2-diaminoethanetetrakis(methylenephosphonic acid) (EDTMP), their sodium, potassium or ammonium salts, or mixtures thereof. Most preferably the phosphonate is 2-phosphonobutane 1,2,4 tricarboxylic acid. The amount of phosphonate present in the composition according to the present invention can be present in an amount of 0 wt. % to about 30 wt. % of phosphonate from about 0 wt. % to about 20 wt. % of phosphonate and from about 0 wt. % to about 10 wt. % of phosphonate.

Chelant

The scale inhibiting compositions of the invention can also include a chelant at a level of from 0 wt. % to 50 wt. %, preferably from 0 wt. % to 30 wt. %, more preferably from 0 wt. % to 10 wt % by weight of total scale inhibiting composition. Chelation herein means the binding or complexation of a bi- or multidentate ligand. These ligands, which are often organic compounds, are called chelants, chelators, chelating agents, and/or sequestering agent. Chelating agents form multiple bonds with a single metal ion. Chelants, are chemicals that form soluble, complex molecules with certain metal ions, inactivating the ions so that they cannot normally react with other elements or ions to produce precipitates or scale. The ligand forms a chelate complex with the substrate. The term is reserved for complexes in which the metal ion is bound to two or more atoms of the chelant. The chelants for use in the present invention are those having crystal growth inhibition properties, i.e. those that interact with the small calcium and magnesium carbonate particles preventing them from aggregating into hard scale deposit. The particles repel each other and remain suspended in the water or form loose aggregates which may settle. These loose aggregates are easily rinse away and do not form a deposit.

Suitable chelating agents can be selected from the group consisting of amino carboxylates, amino phosphonates, polyfunctionally-substituted aromatic chelating agents and mixtures thereof. Preferred chelants for use herein are weak chelants such as the amino acids based chelants and preferably citrate, citrate, tararate, and glutamic-N,N-diacetic acid and derivatives and/or Phosphonate based chelants and preferably Diethylenetriamine penta methylphosphonic acid.

Amino carboxylates include ethylenediaminetetra-acetates, N-hydroxyethylethylenediaminetriacetates, nitrilotriacetates, ethylenediamine tetrapro-prionates, triethylenetetraaminehexacetates, diethylenetriaminepentaacetates, and ethanoldi-glycines, alkali metal, ammonium, and substituted ammonium salts therein and mixtures therein. As well as MGDA (methyl-glycine-diacetic acid), and salts and derivatives thereof and GLDA (glutamic-N,N-diacetic acid) and salts and derivatives thereof. GLDA (salts and derivatives thereof) is especially preferred according to the invention, with the tetrasodium salt thereof being especially preferred.

Other suitable chelants include amino acid based compound or a succinate based compound. The term "succinate based compound" and "succinic acid based compound" are used interchangeably herein. Other suitable chelants are described in U.S. Pat. No. 6,426,229. Particular suitable chelants include; for example, aspartic acid-N-monoacetic acid (ASMA), aspartic acid-N,N-diacetic acid (ASDA), aspartic acid-N-monopropionic acid (ASMP), iminodisuccinic acid (IDS), Imino diacetic acid (IDA), N-(2-sulfomethyl)aspartic acid (SMAS), N-(2-sulfoethyl)aspartic acid (SEAS), N-(2-sulfomethyl)glutamic acid (SMGL), N-(2-sulfoethyl)glutamic acid (SEGL), N-methyliminodiacetic acid (MIDA), .quadrature.-alanine-N,N-diacetic acid (.quadrature-ALDA), serine-N,N-diacetic acid (SEDA), isoserine-N, N-diacetic acid (ISDA), phenylalanine-N,N-diacetic acid (PHDA), anthranilic acid-N,N-diacetic acid (ANDA), sulfanilic acid-N,N-diacetic acid (SLDA), taurine-N,N-diacetic acid (TUDA) and sulfomethyl-N,N-diacetic acid (SMDA) and alkali metal salts or ammonium salts thereof. Also suitable is ethylenediamine disuccinate ("EDDS"), especially the [S,S] isomer as described in U.S. Pat. No. 4,704,233. Furthermore, Hydroxyethyleneiminodiacetic acid, Hydroxyiminodisuccinic acid, Hydroxyethylene diaminetriacetic acid is also suitable.

Other chelants include homopolymers and copolymers of polycarboxylic acids and their partially or completely neutralized salts, monomeric polycarboxylic acids and hydroxycarboxylic acids and their salts. Preferred salts of the above-mentioned compounds are the ammonium and/or alkali metal salts, i.e. the lithium, sodium, and potassium salts, and particularly preferred salts are the sodium salts.

Suitable polycarboxylic acids are acyclic, alicyclic, heterocyclic and aromatic carboxylic acids, in which case they contain at least two carboxyl groups which are in each case separated from one another by, preferably, no more than two carbon atoms. Polycarboxylates which comprise two carboxyl groups include, for example, water-soluble salts of, malonic acid, (ethyl enedioxy) diacetic acid, maleic acid, diglycolic acid, tartaric acid, tartronic acid and fumaric acid. Polycarboxylates which contain three carboxyl groups include, for example, water-soluble citrate. Correspondingly, a suitable hydroxycarboxylic acid is, for example, citric acid. Another suitable polycarboxylic acid is the homopolymer of acrylic acid. Preferred are the polycarboxylates end capped with sulfonates.

Amino phosphonates are also suitable for use as chelating agents and include ethylenediaminetetrakis(methylenephosphonates) as DEQUEST. Preferred, these amino phosphonates that do not contain alkyl or alkenyl groups with more than about 6 carbon atoms.

Polyfunctionally-substituted aromatic chelating agents are also useful in the compositions herein such as described in U.S. Pat. No. 3,812,044. Preferred compounds of this type in acid form are dihydroxydisulfobenzenes such as 1,2-dihydroxy-3,5-disulfobenzene.

Further suitable polycarboxylates chelants for use herein include citric acid, lactic acid, acetic acid, succinic acid, formic acid all preferably in the form of a water-soluble salt. Other suitable polycarboxylates are oxodisuccinates, carboxymethyloxysuccinate and mixtures of tartrate monosuccinic and tartrate disuccinic acid such as described in U.S. Pat. No. 4,663,071.

Cleaning/Detergent Compositions Employing the Scale Control Compositions of the Invention The scale inhibiting compositions of the invention may be included as a component of a detergent/cleaning composition, which would include other components such as a source of alkalinity. Sources of alkalinity can comprise alkali or alkaline earth metal borate, silicate, carbonate, hydroxide, phosphate and mixtures and combinations thereof.

The cleaning composition may also include one or more agents selected from builders (i.e. detergency builders including the class of chelating agents/sequestering agents), bleaches, enzymes and surfactants. The source of alkalinity can comprise from about 45-98 wt. % a second range of 55-95 wt. % and a third range of 65-90% of the detergent composition.

Additional Functional Ingredients

Other active ingredients may optionally be used to improve the effectiveness of the scale control rinse or cleaning/detergent composition. These components may be present in either the cleaning composition which employs the scale control component of the invention, or may be present in scale control formulations themselves. Some non-limiting examples of such additional functional ingredients can include: anticorrosion agents, wetting agents, enzymes, foam inhibitors, antiredeposition agents, anti-etch agents, antimicrobial agents and other ingredients useful in imparting a desired characteristic or functionality in the detergent composition. The following describes some examples of such ingredients.

Surfactant

The composition of the invention can include a surfactant or surfactant system. A variety of surfactants can be used in a warewashing and cleaning compositions, such as anionic, nonionic, cationic, and zwitterionic surfactants. It should be understood that surfactants are an optional component of the warewashing composition and can be excluded from the concentrate. The warewashing composition, when provided as a concentrate, can include the cleaning agent in a range of between about 0 wt. % and about 20 wt. %, between about 0.5 wt. % and about 15 wt. %, between about 1.5 wt. % and about 15 wt. %, between about 1 wt. % and about 10 wt. %, and between about 2 wt. % and about 5 wt. %.

Exemplary surfactants that can be used are commercially available from a number of sources. For a discussion of surfactants, see Kirk-Othmer, Encyclopedia of Chemical Technology, Third Edition, volume 8, pages 900-912. When the warewashing composition includes a cleaning agent, the cleaning agent can be provided in an amount effective to provide a desired level of cleaning.

Anionic surfactants useful in the warewashing composition includes, for example, carboxylates such as alkylcarboxylates (carboxylic acid salts) and polyalkoxycarboxylates, alcohol ethoxylate carboxylates, nonylphenol ethoxylate carboxylates, and the like; sulfonates such as alkylsulfonates, alkylbenzenesulfonates, alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like; and phosphate esters such as alkylphosphate esters, and the like. Exemplary anionic surfactants include sodium alkylarylsulfonate, alpha-olefinsulfonate, and fatty alcohol sulfates.

Nonionic surfactants useful in the warewashing composition include, for example, those having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates, and the like; nonylphenol ethoxylate, polyoxyethylene glycol ethers and the like; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and polyalkylene oxide block copolymers including an ethylene oxide/propylene oxide block copolymer such as those commercially available under the trademark PLURONIC® (BASF-Wyandotte), and the like; and other like nonionic compounds. Silicone surfactants such as the ABIL® B8852 can also be used.

Cationic surfactants that can be used in the warewashing composition include amines such as primary, secondary and tertiary monoamines with $C_{1-8}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl($C_{12}$-$C_{18}$) dimethylbenzyl ammonium chloride, n-tetradecyldimethylbenzylammonium chloride monohydrate, a naphthylene-substituted quaternary ammonium chloride such as dimethyl-1-naphthylmethylammonium chloride, and the like. The cationic surfactant can be used to provide sanitizing properties.

Zwitterionic surfactants that can be used in the warewashing composition include betaines, imidazolines, and propinates. Because the warewashing composition is intended to be used in an automatic dishwashing or warewashing machine, the surfactants selected, if any surfactant is used, can be those that provide an acceptable level of foaming when used inside a dishwashing or warewashing machine. It should be understood that warewashing compositions for use in automatic dishwashing or warewashing machines are generally considered to be low-foaming compositions.

Anticorrosion Agents

The composition may optionally include anticorrosion agents. Anticorrosion agents provide compositions that generate surfaces that are shiner and less prone to biofilm buildup than surfaces that are not treated with compositions having anticorrosion agents. Preferred anticorrosion agents which can be used according to the invention include phosphonates, phosphonic acids, triazoles, organic amines, sorbitan esters, carboxylic acid derivatives, sarcosinates, phosphate esters, zinc, nitrates, molybdate containing components, and borate containing components. Exemplary phosphates or phosphonic acids are available under the name Bayhibit (2-phosphonobutane 1,2,4 tricarboxylic acid) available from LANXESS AG 51369 Leverkusen Germany, DE; and Dequest (i.e., Dequest 7000) from Solutia, Inc. of St. Louis, Mo. Exemplary triazoles are available under the name Cobratec (i.e., Cobratec 100, Cobratec TT-50-S, and Cobratec 99) from PMC Specialties Group, Inc. of Cincinnati, Ohio. Exemplary organic amines include aliphatic amines, aromatic amines, monoamines, diamines, triamines, polyamines, and their salts. Exemplary amines are available under the names Amp (i.e. Amp-95) from Angus Chemical Company of Buffalo Grove, Ill.; WGS (i.e., WGS-50) from Jacam Chemicals, LLC of Sterling, Kans.; Duomeen (i.e., Duomeen O and Duomeen C) from Akzo Nobel Chemicals, Inc. of Chicago, Ill.; DeThox amine (C Series and T Series) from DeForest Enterprises, Inc. of Boca Raton, Fla.; Deriphat series from Henkel Corp. of Ambler, Pa.; and Maxhib (AC Series) from Chemax, Inc. of Greenville, S.C. Exemplary sorbitan esters are available under the name Calgene (LA-series) from Calgene Chemical Inc. of Skokie, Ill. Exemplary carboxylic acid derivatives are available under the name Recor (i.e., Recor 12) from Ciba-Geigy Corp. of Tarrytown, N.Y. Exemplary sarcosinates are available under the names Hamposyl from Hampshire Chemical Corp. of Lexington, Mass.; and Sarkosyl from Ciba-Geigy Corp. of Tarrytown, N.Y.

The composition optionally includes an anticorrosion agent for providing enhanced luster to the metallic portions of a dish machine. When an anticorrosion agent is incorporated into the composition, it is preferably included in an amount of between about 0.05 wt. % and about 5 wt. %, between about 0.5 wt. % and about 4 wt. % and between about 1 wt. % and about 3 wt. %.

Bleaching Agent

Suitable bleaches for use in the alkaline cleaning compositions or scale control compositions of the invention may generally be halogen-based bleaches or oxygen-based bleaches. However, oxygen-based bleaches are preferred.

If no enzyme material is present in the system of the invention, a halogen-based bleach may be effectively used as ingredient of the first component. In that case, said bleach is desirably present at a concentration (as active halogen) in the range of from 0.1 to 10%, preferably from 0.5 to 8%, more preferably from 1 to 6%, by weight. As halogen bleach, alkali metal hypochlorite may be used. Other suitable halogen bleaches are alkali metal salts of di- and tri-chloro and di- and tri-bromo cyanuric acids.

Suitable oxygen-based bleaches are the peroxygen bleaches, such as sodium perborate (tetra- or monohydrate), sodium percarbonate or hydrogen peroxide. These are preferably used in conjunction with a bleach activator which allows the liberation of active oxygen species at a lower temperature. Numerous examples of activators of this type, often also referred to as bleach precursors, are known in the art and amply described in the literature such as U.S. Pat. No. 3,332,882 and U.S. Pat. No. 4,128,494 herein incorporated by reference. Preferred bleach activators are tetraacetyl ethylene diamine (TAED), sodium nonanoyloxybenzene sulphonate (SNOBS), glucose pentaacetate (GPA), tetraacetylmethylene diamine (TAMD), triacetyl cyanurate, sodium sulphonyl ethyl carbonic acid ester, sodium acetyloxybenzene and the mono long-chain acyl tetraacetyl glucoses as disclosed in WO-91/10719, but other activators, such as choline sulphophenyl carbonate (CSPC), as disclosed in U.S. Pat. No. 4,751,015 and U.S. Pat. No. 4,818,426 can also be used.

Peroxybenzoic acid precursors are known in the art as described in GB-A-836,988, herein incorporated by reference. Examples of suitable precursors are phenylbenzoate, phenyl p-nitrobenzoate, o-nitrophenyl benzoate, o-carboxyphenyl benzoate, p-bromophenyl benzoate, sodium or potassium benzoyloxy benzene sulfonate and benzoic anhydride.

Preferred peroxygen bleach precursors are sodium p-benzoyloxy-benzene sulfonate, N,N,N,N-tetraacetyl ethylene diamine (TEAD), sodium nonanoyloxybenzene sulfonate (SNOBS) and choline sulfophenyl carbonate (CSPC).

The amounts of sodium perborate or percarbonate and bleach activator in the first component preferably do not exceed 30% respectively 10% by weight, e.g. are in the range of from 4-30% and from 2-10% by weight, respectively.

Wetting Agents

The cleaning compositions may include a wetting agent which can raise the surface activity of the composition of the invention. The wetting agent may be selected from the list of surfactants previously described. Preferred wetting agents include Triton CF 100 available from Dow Chemical, Abil 8852 available from Goldschmidt, and SLF-18-45 available from BASF. The wetting agent is preferably present from about 0.1 wt. % to about 10 wt. %, more preferably from about 0.5 wt. % to 5 wt. %, and most preferably from about 1 wt. % to about 2 wt. %.

Enzymes

The composition of the invention may include one or more enzymes, which can provide desirable activity for removal of protein-based, carbohydrate-based, or triglyceride-based soils from substrates such as flatware, cups and bowls, and pots and pans. Enzymes suitable for the inventive composition can act by degrading or altering one or more types of soil residues encountered on a surface thus removing the soil or making the soil more removable by a surfactant or other component of the cleaning composition. Both degradation and alteration of soil residues can improve detergency by reducing the physicochemical forces which bind the soil to the surface or textile being cleaned, i.e. the soil becomes more water soluble. For example, one or more proteases can cleave complex, macromolecular protein structures present in soil residues into simpler short chain molecules which are, of themselves, more readily desorbed from surfaces, solubilized, or otherwise more easily removed by detersive solutions containing said proteases. Exemplary types of enzymes include proteases, alpha-amylases, and mixtures thereof. Exemplary proteases that can be used include those derived from *Bacillus licheniformix, Bacillus lenus, Bacillus alcalophilus*, and *Bacillus amyloliquefacins*. Exemplary alpha-amylases include *Bacillus subtilis, Bacillus amyloliquefaceins* and *Bacillus licheniformis*. A valuable reference on enzymes is "Industrial Enzymes," Scott, D., in Kirk-Othmer Encyclopedia of Chemical Technology, 3rd Edition, (editors Grayson, M. and EcKroth, D.) Vol. 9, pp. 173-224, John Wiley & Sons, New York, 1980. The concentrate need not include an enzyme. When the concentrate includes an enzyme, it can be included in an amount that provides the desired enzymatic activity when the warewashing composition is provided as a use composition. Exemplary ranges of the enzyme in the concentrate include between about 0 and about 15 wt. %, between about 0.5 wt. % and about 10 wt. %, and between about 1 wt. % and about 5 wt. %.

Foam Inhibitors

A foam inhibitor may be included for reducing the stability of any foam that is formed. Examples of foam inhibitors include silicon compounds such as silica dispersed in polydimethylsiloxane, fatty amides, hydrocarbon waxes, fatty acids, fatty esters, fatty alcohols, fatty acid soaps, ethoxylates, mineral oils, polyethylene glycol esters, polyoxyethylene-polyoxypropylene block copolymers, alkyl phosphate esters such as monostearyl phosphate and the like. A discussion of foam inhibitors may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein. The composition preferably includes from about 0.0001 wt. % to about 5 wt. % and more preferably from about 0.01 wt. % to about 3 wt. % of the foam inhibitor.

Threshold Inhibitor/Crystal Modifier Component

The detergent composition may also include a threshold agent of crystal modifier for reducing precipitation of calcium carbonate in the use solution. In general, it is expected that the threshold inhibitor/crystal modifier component will loosely hold calcium to reduce precipitation of calcium carbonate once it is subjected to a pH of at least 8.0.

Exemplary threshold inhibitor/crystal modifier components include phosphonocarboxylic acids, phosphonates, polymers, and mixtures thereof. Exemplary phosphonocarboxylic acids include those available under the name Bayhibit™ AM from Bayer, and include 2-phosphonobutane-1, 2,4, tricarboxylic acid (PBTC). Exemplary phosphonates include amino tri(methylene phosphonic acid), 1-hydroxy ethylidene 1-1-diphosphonic acid, ethylene diamine tetra (methylene phosphonic acid), hexamethylene diamine tetra (methylene phosphonic acid), diethylene triamine penta (methylene phosphonic acid), and mixtures thereof. Exemplary phosphonates are available under the name Dequest™ from Monsanto. Exemplary polymers include polyacrylates, polymethacrylates, polyacrylic acid, polyitaconic acid, polymaleic acid, sulfonated polymers, copolymers and mixtures thereof. It should be understood that the mixtures can include mixtures of different acid substituted polymers within the same general class. In addition, it should be understood that salts of acid substituted polymers can be used. The useful carboxylated polymers may be generically categorized as water-soluble carboxylic acid polymers such as polyacrylic and polymethacrylic acids or vinyl addition polymers, in addition to the acid-substituted polymers used in the present invention. Of the vinyl addition polymers contemplated, maleic anhydride copolymers as with vinyl acetate, styrene, ethylene, isobutylene, acrylic acid and vinyl ethers are examples. The polymers tend to be water-soluble or at least colloidally dispersible in water. The molecular weight of these polymers may vary over a broad range although it is preferred to use polymers having average molecular weights ranging between 1,000 up to 1,000,000. These polymers have a molecular weight of 100,000 or less and between 1,000 and 10,000.

The polymers or copolymers (either the acid-substituted polymers or other added polymers) may be prepared by either addition or hydrolytic techniques. Thus, maleic anhydride copolymers are prepared by the addition polymerization of maleic anhydride and another comonomer such as styrene. The low molecular weight acrylic acid polymers may be prepared by addition polymerization of acrylic acid or its salts either with itself or other vinyl comonomers. Alternatively, such polymers may be prepared by the alkaline hydrolysis of low molecular weight acrylonitrile homopolymers or copolymers. For such a preparative technique see Newman U.S. Pat. No. 3,419,502.

The threshold inhibitor/crystal modifier component should be provided in an amount sufficient so that when it is in the use solution, it sufficiently prevents the precipitation of calcium carbonate, and other insoluble salts such as magnesium silicate, magnesium hydroxide and the like or disrupts crystal growth. The threshold inhibitor/crystal modifier component can be provided in an amount of at least about 0.0001 wt. %, and can be provided in a range of between about 0.0001 wt. % and about 25 wt. % based on the weight of the concentrate, and more preferably can be provided in a range of between about 0.001 wt. % and about 10 wt. % based on the weight of the concentrate and most preferably between about 0.01 and 8% based on the weight of the concentrate. It should be understood that the polymers and the phosphonocarboxylates and phosphanates can be used alone or in combination.

Hydrotrope Component

A hydrotrope component can be used to help stabilize the surfactant component. It should be understood that the hydrotrope component is optional and can be omitted if it is not needed for stabilizing the surfactant component. In many cases, it is expected that the hydrotrope component will be present to help stabilize the surfactant component. Examples of the hydrotropes include the sodium, potassium, ammonium and alkanol ammonium salts of xylene, toluene, ethylbenzoate, isopropylbenzene, naphthalene, alkyl naphthalene sulfonates, phosphate esters of alkoxylated alkyl phenols, phosphate esters of alkoxylated alcohols, short chain ($C_8$ or less) alkyl polyglycoside, sodium, potassium and ammonium salts of the alkyl sarcosinates, salts of cumene sulfonates, amino propionates, diphenyl oxides, and disulfonates. The hydrotropes are useful in maintaining the organic materials including the surfactant readily dispersed in the aqueous cleaning solution and, in particular, in an aqueous concentrate which is an especially preferred form of packaging the compositions of the invention and allow the user of the compositions to accurately provide the desired amount of detergent composition.

Antiredeposition Agents

The composition may also include an antiredeposition agent capable of facilitating sustained suspension of soils in a cleaning solution and preventing the removed soils from being redeposited onto the substrate being cleaned. Examples of suitable antiredeposition agents include fatty acid amides, complex phosphate esters, styrene maleic anhydride copolymers, and cellulosic derivatives such as hydroxyethyl cellulose, hydroxypropyl cellulose, and the like. The composition preferably includes from about 0.5 wt. % to about 10 wt. % and more preferably from about 1 wt. % to about 5 wt. % of an antiredeposition agent.

Anti-Etch Agents

The composition may also include an anti-etch agent capable of preventing etching in glass. Examples of suitable anti-etch agents include adding metal ions to the composition such as zinc, zinc chloride, zinc gluconate, aluminum, and beryllium. The composition preferably includes from about 0.1 wt. % to about 10 wt. %, more preferably from about 0.5 wt. % to about 7 wt. %, and most preferably from about 1 wt. % to about 5 wt. % of an anti-etch agent.

Antimicrobial Agent

The compositions may optionally include an antimicrobial agent or preservative. Antimicrobial agents are chemical compositions that can be used in the composition to prevent microbial contamination and deterioration of commercial products material systems, surfaces, etc. Generally, these materials fall in specific classes including phenolics, halogen compounds, quaternary ammonium compounds, metal derivatives, amines, alkanol amines, nitro derivatives, analides, organosulfur and sulfur-nitrogen compounds and miscellaneous compounds. The given antimicrobial agent depending on chemical composition and concentration may simply limit further proliferation of numbers of the microbe or may destroy all or a substantial proportion of the microbial population. The terms "microbes" and "microorganisms" typically refer primarily to bacteria and fungus microorganisms. In use, the antimicrobial agents are formed into the final product that when diluted and dispensed using an aqueous stream forms an aqueous disinfectant or sanitizer composition that can be contacted with a variety of surfaces resulting in prevention of growth or the killing of a substantial proportion of the microbial population. Common antimicrobial agents that may be used include phenolic antimicrobials such as pentachlorophenol, orthophenylphenol; halogen containing antibacterial agents that may be used include sodium trichloroisocyanurate, sodium dichloroisocyanurate (anhydrous or dihydrate), iodine-poly(vinylpyrrolidin-onen) complexes, bromine compounds such as 2-bromo-2-nitropropane-1,3-diol; quaternary antimicrobial agents such as benzalconium chloride, cetylpyridiniumchloride; amines and nitro containing antimicrobial compositions such as hexahydro-1,3,5-tris(2-hydroxyethyl)-s-triazine, dithiocarbamates such as sodium dimethyldithiocarbamate, and a variety of other materials known in the art for their microbial properties. Antimicrobial agents may be encapsulated to improve stability and/or to reduce reactivity with other materials in the detergent composition. When an antimicrobial agent or preservative is incorporated into the composition, it is preferably included in an amount of between about 0.01 wt. % to about 5 wt. %, between about 0.01 wt. % to about 2 wt. %, and between about 0.1 wt. % to about 1.0 wt. %.

The compositions may also include additional materials, such as additional functional materials, for example, an additional source of alkalinity, an additional surfactant, an additional chelating agent, a sequestering agent, a bleaching agent, a thickening agent, a solubility modifier, a detergent filler, a defoamer, an anti-redeposition agent, a threshold agent or system, an aesthetic enhancing agent (i.e. dye, perfume, etc.) and the like, or combinations or mixtures thereof. Adjuvants and other additive ingredients will vary according to the type of composition being manufactured and can be included in the compositions in any amount. In at least some embodiments, any additional functional materials that are added to the composition are compatible with the other components within the composition. For example, because chlorine will be substantially present within most compositions, it may be useful that any additional materials be chlorine compatible.

The Warewashing Process

The inventive scale inhibiting compositions of the invention may be generally utilized in any of the conventional, domestic and institutional, warewashing machines.

However, as mentioned above, both the cleaning system and the warewashing method of the present invention are particularly suitable for use in an institutional mechanical warewashing machine as the CMC anti scale agent will prevent not only scale from depositing on dishes to be cleaned, but also the warewashing machine itself.

Typical institutional warewashing processes are either continuous or non-continuous and are conducted in either a single-tank or a multi-tank/conveyor-type machine.

In the conveyor-type system prewash, wash, post-wash rinse and drying zones are generally established using partitions. Wash water is introduced into the post-wash rinsing zone and is passed cascade-fashion back toward the prewash zone while the dirty dishware is transported in a countercurrent direction. In an alternative (so called "by-pass") process, this rinse-water is introduced into the pre-wash zone. It may be attractive to combine this "by-pass" process with the method of the present invention, because in this way a pH-gradient is created over the wash tanks, which is likely to lead to more optimal conditions for soil removal. For instance, enzymes—when present in the first component—can become more active at the more neutral pH-conditions resulting from the introduction of acid post-wash rinse composition into the prewash zone. Various multi-tank warewashing machines have the option to rinse only when dishes are passed through the post-wash rinsing section. It can be attractive to combine this option with the method of the present invention, because in that way the volume of the acid rinse solution is limited. Such limited acid rinse volume will only have a limited effect as to its ability to reduce the alkalinity of the main wash solution.

Furthermore, each component of the cleaning system of the invention is applied in the warewashing machine using conventional means such as suitable spray nozzles or jets directed upwards and/or downwards toward the dishware.

Formulating the Scale Control Composition

The scale control composition can be formulated to handle the expected scale deposition in a given environment. That is, the concentration of the scale inhibiting composition in a cleaning composition can be adjusted depending upon several factors at the situs of use including, for example, water hardness, food soil concentration, alkalinity and the like. In machine warewashing applications, a food soil concentration of about 25 grams per gallon or more is considered high, a concentration of about 15 to about 24 grams per gallon is considered medium, and a concentration of about 14 grams per gallon or less is considered low. Water hardness exhibiting 15 grains per gallon or more is considered high, about 6 to about 14 grains per gallon is considered medium, and about 5 grains per gallon or less is considered low. In a use composition, an alkalinity of about 300 ppm or higher is considered high, an alkalinity of about 200 ppm to about 300 ppm is considered medium, and an alkalinity of about 200 ppm or less is considered low. In a use composition, a builder concentration of about 300 ppm or more is considered high, a builder concentration of about 150 ppm to about 300 ppm is considered medium, and a builder concentration of 150 ppm or less is considered low.

Based on the desired minimum concentration of the scale inhibiting composition in the use composition, the amount of the scale inhibiting composition in the concentrate can be calculated knowing the solids content of the use composition and the concentrate can be formulated to provide at least the desired level of protection.

Forming a Concentrate

The components can be mixed and extruded or cast to form a solid such as pellets, powders or blocks. Heat can be applied from an external source to facilitate processing of the mixture.

A mixing system provides for continuous mixing of the ingredients at high shear to form a substantially homogeneous liquid or semi-solid mixture in which the ingredients are distributed throughout its mass. The mixing system includes means for mixing the ingredients to provide shear effective for maintaining the mixture at a flowable consistency, with a viscosity during processing of about 1,000-1,000,000 cP, preferably about 50,000-200,000 cP. The mixing system can be a continuous flow mixer or a single or twin screw extruder apparatus.

The mixture can be processed at a temperature to maintain the physical and chemical stability of the ingredients, such as at ambient temperatures of about 20-80° C., and about 25-55° C. Although limited external heat may be applied to the mixture, the temperature achieved by the mixture may become elevated during processing due to friction, variances in ambient conditions, and/or by an exothermic reaction between ingredients. Optionally, the temperature of the mixture may be increased, for example, at the inlets or outlets of the mixing system.

An ingredient may be in the form of a liquid or a solid such as a dry particulate, and may be added to the mixture separately or as part of a premix with another ingredient, as for example, the scale control component may be separate from the remainder of the warewash detergent. One or more premixes may be added to the mixture.

The ingredients are mixed to form a substantially homogeneous consistency wherein the ingredients are distributed substantially evenly throughout the mass. The mixture can be discharged from the mixing system through a die or other shaping means. The profiled extrudate can be divided into useful sizes with a controlled mass. The extruded solid can be packaged in film. The temperature of the mixture when discharged from the mixing system can be sufficiently low to enable the mixture to be cast or extruded directly into a packaging system without first cooling the mixture. The time between extrusion discharge and packaging can be adjusted to allow the hardening of the detergent block for better handling during further processing and packaging. The mixture at the point of discharge can be about 20-90° C., and about 25-55° C. The composition can be allowed to harden to a solid form that may range from a low density, sponge-like, malleable, caulky consistency to a high density, fused solid, concrete-like block.

Optionally, heating and cooling devices may be mounted adjacent to mixing apparatus to apply or remove heat in order to obtain a desired temperature profile in the mixer. For example, an external source of heat may be applied to one or more barrel sections of the mixer, such as the ingredient inlet section, the final outlet section, and the like, to increase fluidity of the mixture during processing. Preferably, the temperature of the mixture during processing, including at the discharge port, is maintained preferably at about 20-90° C.

When processing of the ingredients is completed, the mixture may be discharged from the mixer through a discharge die. The solidification process may last from a few minutes to about six hours, depending, for example, on the size of the cast or extruded composition, the ingredients of the composition, the temperature of the composition, and other like factors. Preferably, the cast or extruded composition "sets up" or begins to harden to a solid form within about 1 minute to about 3 hours, preferably about 1 minute to about 2 hours, most preferably about 1 minute to about 1.0 hours minutes.

The concentrate can be provided in the form of a liquid. Various liquid forms include gels and pastes. Of course, when the concentrate is provided in the form of a liquid, it is not necessary to harden the composition to form a solid. In fact, it is expected that the amount of water in the composition will be sufficient to preclude solidification. In addition, dispersants and other components can be incorporated into the concentrate in order to maintain a desired distribution of components.

The packaging receptacle or container may be rigid or flexible, and composed of any material suitable for containing the compositions produced according to the invention, as for example glass, metal, plastic film or sheet, cardboard, cardboard composites, paper, and the like. The composition is processed at around 150-170° F. and are generally cooled to 100-150° before packaging. so that processed mixture may be cast or extruded directly into the container or other packaging system without structurally damaging the material. As a result, a wider variety of materials may be used to manufacture the container than those used for compositions that processed and dispensed under molten conditions.

The packaging material can be provided as a water soluble packaging material such as a water soluble packaging film. Exemplary water soluble packaging films are disclosed in U.S. Pat. Nos. 6,503,879; 6,228,825; 6,303,553; 6,475,977; and 6,632,785, the disclosures of which are incorporated herein by reference. An exemplary water soluble polymer that can provide a packaging material that can be used to package the concentrate includes polyvinyl alcohol. The packaged concentrate can be provided as unit dose packages or multiple dose packages. In the case of unit dose packages, it is expected that a single packaged unit will be placed in a dishwashing machine, such as the detergent compartment of the dishwashing machine, and will be used up during a single wash cycle. In the case of a multiple dose package, it is expected that the unit will be placed in a hopper and a stream of water will erode a surface of the concentrate to provide a liquid concentrate that will be introduced into the dishwashing machine.

While the invention is described in the context of a warewashing composition for washing articles in an automatic dishwashing machine, it should be understood that the detergent compositions employing the scale control composition can be used for washing non-ware items. That is, the warewashing composition can be referred to as a cleaning composition and can be used to clean various items. It should be understood that certain components that may be included in a warewashing composition because it is intended to be used in an automatic dishwashing machine can be excluded from a cleaning composition that is not intended to be used in an automatic dishwashing machine, and vice versa. For example, surfactants that have a tendency to create quite a bit of foaming may be used in a cleaning composition that is not intended to be used in an automatic dishwashing machine.

Exemplary ranges of the warewashing composition which employs the scale inhibiting compositions of the invention in its simplest aspect include a source of alkalinity and a scale inhibitor composition of the invention. The source of alkalinity typically comprises between a first range of 45-98 wt. % a second range of 55-95 wt. % and a third range of 65-90%. The scale control composition would be the remainder.

Exemplary ranges for scale control component are shown in table 1.

TABLE 1

Representation scale inhibiting compositions (percent by weight):

| | First range | second range | third range |
|---|---|---|---|
| Chelant | 0-50 | 0-30 | 0-10 |
| phosphonate | 0-30 | 0-20 | 0-10 |
| Polymer | 0-30 | 0-25 | 0-20 |
| Sodium CMC | 0.1-30 | 0.1-25 | 0.1-20 |

The present invention will now be further illustrated by way of the following non-limiting examples, in which parts and percentages are by weight unless otherwise indicated.

The invention will now be illustrated by the following non-limiting examples.

EXAMPLES

100 Cycle Warewash Test Procedure

One Hundred-Cycle Film Evaluation for Institutional Warewash Detergents

Purpose:
To provide a generic method for evaluating glass and plastic film accumulation in an institutional warewash machine. This procedure is used to evaluate test formulations, Ecolab products, and competitive products.

Principle:
Test glasses are washed in an institutional warewash machine with a predetermined concentration of detergent. All of the glasses are left untreated and examined for film accumulation.

Apparatus and Materials:
1. Institutional machine hooked up to the appropriate water supply
2. Raburn glass rack
3. Libbey heat resistant glass tumblers, 10 oz.
4. Cambro Newport plastic tumblers
5. Sufficient detergent to complete the test
6. Titrator and reagents to titrate alkalinity
7. Water hardness test kit Preparation:
1. Clean 6 glasses according to above procedure.
2. Fill the dishmachine with the appropriate water. Test the water for hardness. Record the value. Turn on tank heaters.
3. Turn on the dishmachine and run wash/rinse cycles through the machine until a wash temperature of 150-160° F. and rinse temperature of 175-190° F. is reached.
4. Set controller to dispense appropriate amount of detergent into the wash tank. Titrate to verify detergent concentration.
5. Place 6 clean glasses diagonally and four plastic tumblers off-diagonally in the Raburn rack and place the rack inside the dishmachine.
6. Begin 100 cycle test
7. At the beginning of each wash cycle, the appropriate amount of detergent is automatically dispensed into the warewash machine to maintain the initial detergent concentration. Detergent concentration is controlled by conductivity.

Procedure:
1. Begin 100 cycle test
2. After the completion of each cycle, the machine is appropriately dosed (automatically) to maintain the initial concentration.
3. Let the glasses and tumblers dry overnight. Grade all glasses for film accumulation using Image Analysis. (a number around 15000 indicates a perfectly clean glass. Any number lower than 40000 is visually acceptable for scale control performance.)

RESULTS

| | (active) ppm | E1/AM14 | | | Mean | stdev |
|---|---|---|---|---|---|---|
| 17 grain | 199.99 | 227.90 | sodium citrate dehydrate | 1 | 18902.36 | 2345.23 |
| | 40.00 | 100.00 | Aquatreat 801 40% | 2 | 25739.66 | 4578.11 |
| | 40.00 | 40.00 | CMC (230102) | 3 | 33553.60 | 4073.29 |
| | 449.41 | 402.14 | NaOH beads | 4 | 32564.72 | 4569.00 |
| | | 149.72 | NaOH 50% | 5 | 30473.01 | 5679.25 |
| | | 919.76 | use concentration | 6 | 26038.41 | 3926.20 |
| | (active) | E1/AM14 | | | mean | stdev |
| 10 grain | 199.99 | 227.90 | sodium citrate dehydrate | 1 | 16990.55 | 2055.09 |
| | 40.00 | 100.00 | Aquatreat 801 40% | 2 | 19870.42 | 2971.35 |
| | 40.00 | 40.00 | CMC (230102) | 3 | 27793.71 | 4765.36 |
| | 449.41 | 402.14 | NaOH beads | 4 | 20967.26 | 3053.40 |
| | | 149.72 | NaOH 50% | 5 | 18841.27 | 2535.05 |
| | | 919.76 | use concentration | 6 | 16305.26 | 2353.56 |
| 10 grain | 199.99 | 227.90 | sodium citrate dehydrate | 1 | 23447.08 | 3926.62 |
| | 40.00 | 40.00 | CMC (230102) | 2 | 17579.46 | 2283.62 |
| | 8.00 | 16.00 | Bayhibit AM 50% | 3 | 14500.88 | 1763.44 |
| | 350.00 | 249.90 | NaOH beads | 4 | 15319.13 | 2520.85 |
| | | 200.20 | NaOH 50% | 5 | 16679.14 | 1969.52 |
| | | 734.00 | use concentration | 6 | 20095.45 | 3279.87 |
| 17 grain | 68.00 | 170.00 | Aquatreat 801 40% | 1 | 21473.00 | 4519.92 |
| | 44.20 | 68.00 | CMC (230094) | 2 | 25112.30 | 3484.31 |
| | 363.66 | 383.89 | NaOH beads | 3 | 22661.66 | 2997.96 |
| | | 26.02 | NaOH 50% | 4 | 30053.64 | 4250.17 |
| | 6.00 | 6.00 | Pluronic N3 | 5 | 19213.08 | 2433.22 |
| | | 653.90 | use concentration | 6 | 19711.12 | 3280.62 |

-continued

RESULTS

| | (active) | W3/AM14 | 100 cycles | | mean | stdev |
|---|---|---|---|---|---|---|
| 17 grain | 200.22 | 307.00 | sodium tartrate dihydrate | 1 | 22549.82 | 3057.41 |
| | 40.00 | 100.00 | Aquatreat 801 40% | 2 | 44145.30 | 7712.34 |
| | 26.00 | 40.00 | CMC RM: 230094 | 3 | 62502.60 | 4572.98 |
| | 376.41 | 388.00 | NaOH beads | 4 | 59038.49 | 5227.32 |
| | | 32.00 | NaOH 50% | 5 | 41458.10 | 5320.35 |
| | 6.00 | 6.00 | Pluronic N3 | 6 | 21258.34 | 2759.16 |
| | | 873.00 | use concentration | | | |

| | (active) | W3/AM14 | | | mean | stdev |
|---|---|---|---|---|---|---|
| 17 grain | 199.99 | 227.90 | sodium citrate dihydrate | 1 | 48080.92 | 2511.61 |
| | 40.00 | 40.00 | CMC RM: 230102 | 2 | 65535.00 | 0.00 |
| | 8.00 | 16.00 | Bayhibit AM 50% | 3 | 65535.00 | 0.00 |
| | 344.07 | 249.90 | NaOH beads | 4 | 65535.00 | 0.00 |
| | | 200.20 | NaOH 50% | 5 | 65535.00 | 0.00 |
| | 6.00 | 6.00 | Pluronic N3 | 6 | 38321.68 | 3675.53 |
| | | 740.00 | | | | |

| | (active) | E1/AM14 | 100 cycles | | mean | stdev |
|---|---|---|---|---|---|---|
| 10 grain | 40.00 | 100.00 | Aquatreat 801 40% | 1 | 14942.77 | 2022.049 |
| | 23.00 | 40.00 | Sodium CMC (230094) | 2 | 14491.66 | 2130.567 |
| | 200.00 | 307.00 | Sodium tartrate dehydrate (tartaric) | 3 | 14928.79 | 2264.526 |
| | 450.00 | 450.00 | NaOH | 4 | 14828.9 | 2064.848 |
| | 6.00 | 6.00 | Pluronic N3 | 5 | 14812.97 | 2133.302 |
| | | 984.76 | use concentration | 6 | 14920.58 | 2209.126 |
| | | | | ave | 14820.95 | 2137.40 |
| 17 grain | 150 | 227.9 | Sodium Citrate Dihydrate | 1 | 25533.94 | 3108.261 |
| | 26 | 40 | CMC (230094) | 2 | 26168.53 | 2973.85 |
| | 8 | 10.6 | Bayhibit S | 3 | 43017.97 | 2369.769 |
| | 350 | 350 | NaOH | 4 | 54848.73 | 3897.301 |
| | 6 | 6 | Pluronic N3 | 5 | 28980.46 | 3803.123 |
| | | 742.5 | use concentration | 6 | 24961.56 | 2512.588 |
| | | | | ave | 33918.532 | 3110.815 |

| | (active) ppm | E1/AM14 | | | Mean | |
|---|---|---|---|---|---|---|
| 17 grain | 8 | 16 | Bayhibit AM | 1 | 15464 | |
| | 35 | 87.5 | Aquatreat 801 40% | 2 | 19578 | |
| | 16 | 25 | CMC (RM#230094) | 3 | 24655 | |
| | 350 | 350 | NaOH beads | 4 | 25043 | |
| | 110 | 220 | NaOH 50% | 5 | 16442 | |
| | | 698.5 | use concentration | 6 | 14827 | |
| 17 grain | 8 | 16 | Bayhibit AM | 1 | 14290 | |
| | 15 | 30 | Acusol 448 | 2 | 14211 | |
| | 15 | 30 | Belclene 283 | 3 | 21358 | |
| | 16 | 25 | CMC (RM#230094) | 4 | 20276 | |
| | 320 | 320 | NaOH beads | 5 | 14254 | |
| | 135 | 270 | NaOH 50% | 6 | 14559 | |
| | | 691 | use concentration | | | |

What is claimed is:

1. A scale control composition for use in an alkaline environment comprising:
   sodium carboxymethyl cellulose present between about 0.1 wt, % to about 30 wt. %;
   a polymaleic acid polymer, copolymer, terpolymer, or combination of the same with a molecular weight of about 200-2000 present between about 0.01 wt, % to about 30 wt. %; a phosphonate; and a chelant;
   wherein the ratio of said sodium carboxymethyl cellulose and said polymer, copolymer, terpolymer, or combination of the same is between about 1:5 and about 5:1 by weight percent; and
   wherein said sodium carboxyethyl cellulose has a molecular weight between about 250,000 and about 700,000.

2. The scale control composition of claim 1 wherein said sodium carboxymethyl cellulose and polymer, copolymer, terpolymer, or combination of the same are present in a ratio between about 1:3 and about 5:1 by weight percent.

3. The scale control composition of claim 1 wherein said phosphonate is present between about 0.01 wt. % and about 30 wt. %.

4. The scale control composition of claim 1 wherein said chelant is present between about 0.01 wt. % and about 50 wt. %.

5. The scale control composition of claim 1 wherein said chelant is selected from the group consisting of citrate, tararate, glutamic-N,N-diacetic acid, phosphonate, derivatives thereof, and combinations of the same.

6. The scale control composition of claim 1 wherein said chelant is present between about 0.01 wt % and about 30 wt, %.

7. The scale control composition according to claim 1, wherein the composition comprises between about 0.1 wt. % and about 20 wt. % of sodium carboxymethyl cellulose.

8. The scale control composition according to claim 1, wherein the composition comprises between about 0.1 wt. % and about 20 wt. % of a polymaleic polymer, copolymer, terpolymer, or combination of the same.

9. The scaled control composition of claim 1 wherein the composition comprises between about 0.01 wt. % and about 20 wt. % of phosphonate.

10. The scale control composition of claim 1 wherein said composition comprises between about 0.01 wt. % and about 20 wt. % of chelant.

11. A scale inhibitor component for use in warewashing and other detergent compositions comprising:
  sodium carboxymethyl cellulose present between about 0.1 wt. % to about 25 wt. %, polymaleic acid and its salt form with a molecular weight of about 200-2000 present between about 0.01 wt. % and about 25 wt. %, a phosphonate present between about 0.01 wt. % and about 20 wt. %, and a chelant selected from the group consisting of citrate, tararate, glutamic-N,N-diacetic acid, phosphonate, derivatives thereof, and combinations of the same present between about 0.01 wt. % and 30 wt. %;
  wherein the ratio of said sodium carboxymethyl cellulose to said polymaleic acid is between about 1:5 and about 5:1 by weight percent; and
  wherein said sodium carboxymethyl cellulose has a molecular weight between about 250,000 and about 700,000.

12. A method of inhibiting scale formation on surfaces comprising:
  applying a scale inhibiting composition to a surface, said composition comprising sodium carboxymethyl cellulose present between about 0.1 to about 30 wt, %; polymaleic acid polymer, copolymers, terpolymers, or combination of the same with a molecular weight of about 200-2000 present between about 0.01 to about 30 wt. %; a phosphonate; and a chelant; wherein the ratio of said sodium carboxymethyl cellulose to said polymer is between about 1:5 and about 5:1 by weight percent; and wherein said sodium carboxylmethyl cellulose has a molecular weight between about 250,000 and about 700,000;
  and rinsing with water, wherein said applying is accomplished in an alkaline environment.

13. The method of claim 12 wherein said phosphonate is present between about 0.01 wt. % and about 30 wt. %.

14. The method of claim 12 wherein said chelant is present between about 0.01 wt. % and about 50 wt, % in said scale inhibiting composition.

15. A cleaning composition comprising the scale inhibiting composition of claim 1.

16. The cleaning composition of claim 15 further comprising a source of alkalinity.

17. The cleaning composition of claim 15 further comprising a defoaming agent.

18. The cleaning composition of claim 14 wherein said chelant is selected from the group consisting of a citrate, tararate, glutamic-N,N-diacetic acid, phosphonate, derivatives thereof, and combinations of the same.

19. A detergent composition comprising:
  (a) the scale control composition of claim 1;
  (b) a surfactant consisting essentially of a nonionic surfactant present between about 0.01 wt, % and about 5 wt. %;
  (c) an alkalinity source present between about 45 wt, % and about 98 wt, %.

20. The scale control composition of claim 1, further comprising a polyacrylic acid polymer, copolymer, terpolymer, acrylic/maleic copolymer, or mixtures thereof.

* * * * *

UNITED STATES PATENT AND TRADEMARK OFFICE
CERTIFICATE OF CORRECTION

| | | |
|---|---|---|
| PATENT NO. | : 8,729,006 B2 | Page 1 of 1 |
| APPLICATION NO. | : 13/170384 | |
| DATED | : May 20, 2014 | |
| INVENTOR(S) | : Altony J. Miralles et al. | |

It is certified that error appears in the above-identified patent and that said Letters Patent is hereby corrected as shown below:

In the Claims

Col. 19, Claim 1, Line 54:
DELETE after 0.1 "wt,"
ADD after 0.1 --wt.--

Col. 20, Claim 6, Line 63:
DELETE after 30 "wt,"
ADD after 30 --wt.--

Col. 21, Claim 12, Line 32:
DELETE after 30 "wt,"
ADD after 30 --wt.--

Col. 22, Claim 13, Line 13:
DELETE after 50 "wt,"
ADD after 50 --wt.--

Col. 22, Claim 19, Line 28:
DELETE after 0.01 "wt,"
ADD after 0.01 --wt.--

Col. 22, Claim 19, Line 29:
DELETE after 45 "wt,"
ADD after 45 --wt.--

Col. 22, Claim 19, Line 30:
DELETE after 98 "wt,"
ADD after 98 --wt.--

Signed and Sealed this
Twenty-sixth Day of August, 2014

Michelle K. Lee
*Deputy Director of the United States Patent and Trademark Office*